US005389415A

United States Patent [19]

Kaufmann

[11] Patent Number: 5,389,415

[45] Date of Patent: Feb. 14, 1995

[54] PEEL-BACK RE-SEALABLE MULTI-PLY LABEL

[75] Inventor: Thomas R. Kaufmann, Birchrunville, Pa.

[73] Assignee: Beckett Corporation, Lionville, Pa.

[21] Appl. No.: 156,574

[22] Filed: Nov. 19, 1993

Related U.S. Application Data

[63] Continuation of Ser. No. 961,864, Oct. 15, 1992, Pat. No. 5,264,265.

[51] Int. Cl.[6] .................... B32B 9/00

[52] U.S. Cl. .................... 428/40; 428/41; 428/42; 428/43; 428/192; 428/198; 428/354; 283/80; 283/81

[58] Field of Search .................... 428/40, 41, 42, 43, 428/192, 198, 354; 283/80, 81

[56] References Cited

U.S. PATENT DOCUMENTS 4,060,168 11/1977 Romagnoli .................... 206/16
4,323,608 4/1982 Denny et al. .................... 428/43
4,367,251 1/1983 Crivello .................... 428/40
4,526,405 7/1985 Hattemer .................... 283/81
4,528,055 7/1985 Hattemer .................... 156/247
4,592,572 6/1986 Instance .................... 281/2
5,264,265 11/1993 Kaufmann .................... 428/40

*Primary Examiner*—Patrick J. Ryan
*Assistant Examiner*—Abraham Bahta
*Attorney, Agent, or Firm*—Ostrolenk, Faber, Gerb & Soffen

[57] ABSTRACT

A multi-ply, re-sealable label intended for retail use to provide extended text and graphics for consumer information. The label construction includes multiple plies of flexible printed materials using bonding agents and release coatings which allow for numerous openings and pre-closures. The label incorporates a consumer-friendly peel-tab for easy opening and re-closure, materials with a natural "memory" to facilitate re-closure and re-sealability without the use of a tacky adhesive.

11 Claims, 2 Drawing Sheets

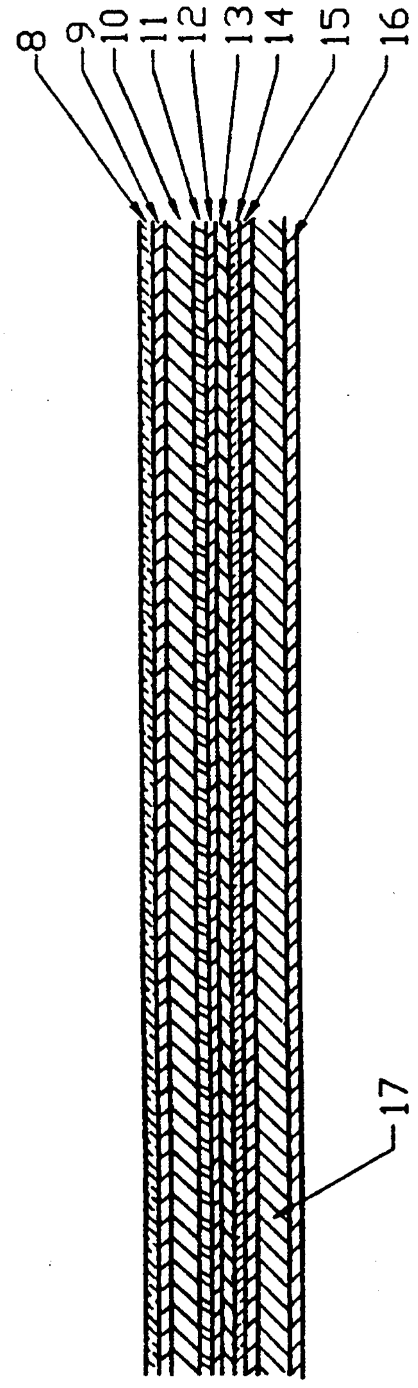
FIG. 2
FIG. 3
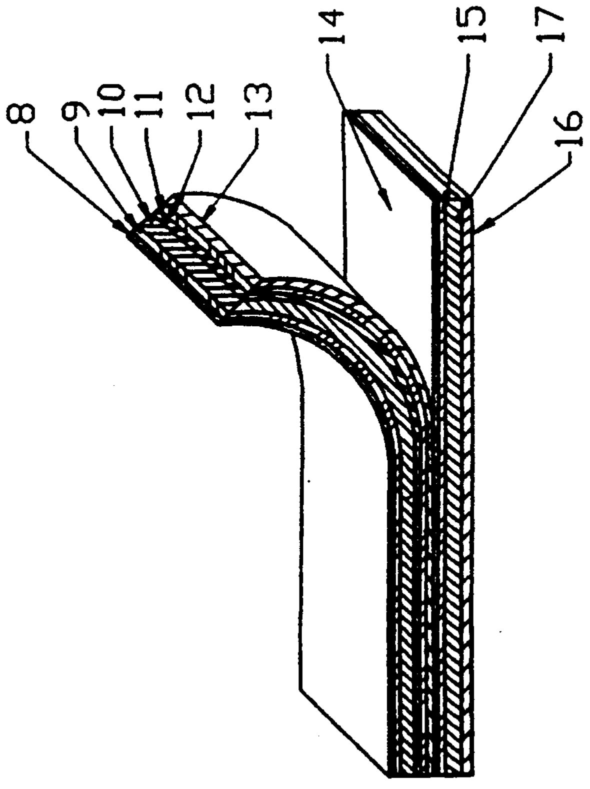

PEEL-BACK RE-SEALABLE MULTI-PLY LABEL

This is a continuation of application Ser. No. 07/961,864, filed Oct. 15, 1992, now U.S. Pat. No. 5,264,265.

BACKGROUND OF THE INVENTION

1. Field of the Invention

The present invention relates to labels to be attached, typically by a pressure sensitive adhesive, to packages and containers such as cans, bottles, jars, boxes, etc. More specifically, the invention relates to multi-ply labels, capable of multiple openings and reclosures, for providing extended text and graphics that may be viewed by the consumer, while minimizing adverse impact on the manufacturer's package or container design.

2. Description of the Related Art

Recently, packages and containers have utilized multi-ply and/or folded multi-panel, re-sealable labels as secondary elements of the container. See, e.g., U.S. Pat. Nos. 1,896,834, 1,924,909, and 2,127,081 to Brown, U.S. Pat. No. 4,323,608 to Denny et al, U.S. Pat. No. 4,529,229 to Glibbery, U.S. Pat. No. 4,534,582 to Howard, U.S. Pat. Nos. 4,592,572, 4,711,686, 4,726,972, 4,744,161, 4,744,161, 4,744,591, and 4,830,406 to Instance, U.S. Pat. Nos. 4,621,442 and 4,621,837 to Mack, U.S. Pat. No. 4,889,234 to Sorensen et al., U.S. Pat. No. 5,021,273 to Kobayashi, and U.S. Pat. No. 5,074,595 to Hill et al.

The inventions disclosed in the above patents address the informational needs of the manufacturer without regard to certain consumer sensitivities and/or regulatory concerns. Specifically, all of the inventions referenced in the above patents that offer re-closure rely on a tacky pressure sensitive adhesive for re-sealability. This construction: (a) requires that the consumer actively re-fold and apply pressure to re-seal the label; and (b) allows the possibility of contamination of the tacky adhesive with dirt, oil, etc. from the consumer's skin. Additionally, many of the above inventions involve, as an opening mechanism, the tearing of a perforation, which is not considered consumer-friendly or cosmetically desirable by manufacturers.

SUMMARY OF THE INVENTION

It is therefore an object of the present invention to provide a re-sealable multi-ply label utilizing materials and methods which provide multiple openings and re-closures without the use of a tacky pressure sensitive adhesive for resealability.

Another object of the invention is to provide a consumer-friendly "peel tab" mechanism for easy opening and peel-back of the top ply.

Another object of the invention is to provide a structure that re-closes by design in the event the consumer does not actively re-seal the label.

Another object of the invention is to provide a "hinge", a permanent bond that resists inadvertent removal of the top ply and provides tamper evidence in the event of intentional removal.

The present invention achieves the foregoing objectives by providing a peel-back re-sealable multi-ply label including a bottom ply and a top ply, the top ply being bonded to the bottom ply with permanent adhesive along one edge to form a hinge. A peel tab area is preferably provided on the edge of the label opposite the hinge, the bottom ply being die cut and bonded to the top ply at the peel-tab area.

At all areas other than at the hinge and the peel-tab, the top ply is releasably bonded to the bottom ply. The releasable bond is preferably formed of a permanent pressure sensitive adhesive, a detackifying layer and a release layer. The detackifying layer is preferably a liquid varnish. The release layer is preferably an ultraviolet curable layer of multi-functional oligomers and acrylates and reactive silicones.

The underside of the bottom ply is preferably coated with a pressure sensitive adhesive for affixing the label to the container. The upper side of the bottom ply is preferably printed with graphics.

The top ply has graphics printed on both its upper and underside, and a protective overvarnish is preferably coated over the graphics on the upper side.

The top ply and bottom ply are preferably a white, opaque flexible olefin film.

The above construction provides a label capable of multiple openings and re-closures without requiring the use of a tacky adhesive for resealability. The novel hinge construction causes the label to reclose automatically if the consumer neglects to actively reseal the label, and provides tamper evidence if the top ply is intentionally removed. The novel peel tab structure facilitates opening and peel-back of the top ply.

Other features and advantages of the present invention will become apparent from the following description of the invention which refers to the accompanying drawings.

BRIEF DESCRIPTION OF THE DRAWINGS

FIG. 2 is an enlarged sectional view of invention in a flat condition.

FIG. 3 is an enlarged sectional view of the invention showing the separation of the top and bottom plies.

DETAILED DESCRIPTION OF THE PREFERRED EMBODIMENT

Figure 1:
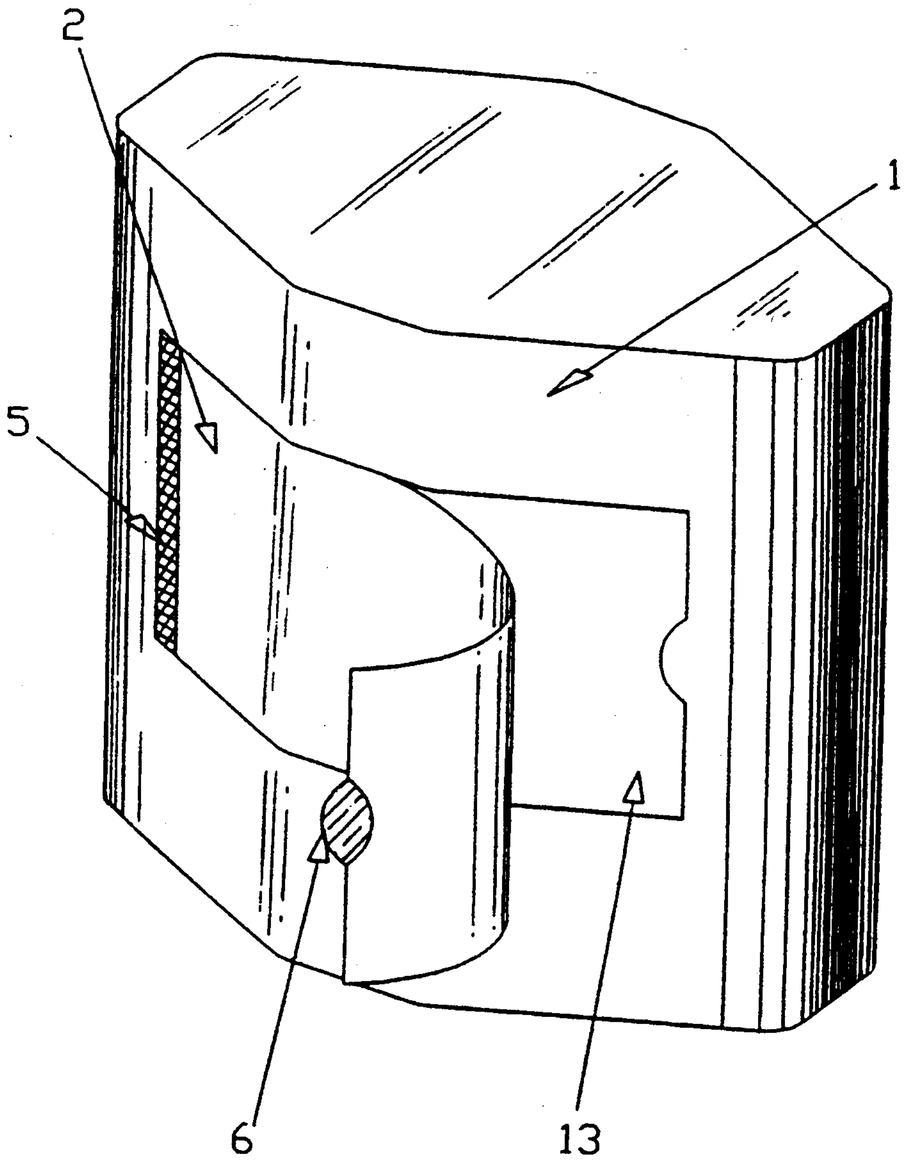
FIG. 1 is a front view which illustrates the invention as it is applied to the surface of the container.

Referring first to FIG. 1, the multi-ply label is shown attached to a container 1. The label includes the top ply 2, permanently adhered via permanent adhesive along edge 5 (the hinge) to the bottom ply. Additionally, the top ply 2 is bonded permanently to the bottom ply 3 in an area 6 which functions as a consumer peel-tab. The underside of the bottom ply is affixed to the container, preferably with permanent pressure sensitive adhesive (identified by reference numeral 16 on FIG. 2). There is no tacky adhesive on the underside portion of the bottom ply functioning as part of the peel-tab 6. The bottom ply 3 is die cut in the peel-tab area 6 to allow that portion of the bottom ply to peel back with the top ply.

FIGS. 2 and 3 show the invention in greater detail. The top ply consists preferably of a white, opaque, flexible, olefin film 10, with graphics layers 9 and 12 printed on the front and back sides, respectively, and a protective overvarnish 8 applied to the front graphics 9. The film 10 is coated on the underside with a solution acrylic, permanent, pressure sensitive adhesive 11. A portion of that adhesive 11 is coated with a liquid varnish 13 which acts as a detackifying or deadening agent to the adhesive.

The bottom ply consists preferably of a white, opaque, flexible olefin film 17, coated on the underside with a solution acrylic, permanent, pressure sensitive adhesive 16, which is used to affix the label to the container, and is printed on the upperside with a graphics layer 15. An ultraviolet curable layer 14 consisting of multi-functional oligomers and acrylates and reactive silicones provides a dual function of protecting the graphics layer 15 and acting as a releasing and re-sealing layer between the top and bottom plies.

The top ply is bonded permanently to the bottom ply via a portion of the adhesive layer 11 to form a hinge (identified by reference numberal 5 on FIG. 1), and releasably in all other areas. The peel-tab 6 is formed by permanently bonding the top ply to a portion of the bottom ply. That portion of the bottom ply is die cut to separate it from the remainder of the bottom ply. Additionally, that portion of the bottom ply has no tacky adhesive on the underside, allowing it to remove cleanly from the container.

The film 10 used on the top ply is designed such that, after it is peeled back by the consumer from the bottom ply, it tends to spring back and lay flat on the bottom ply if the consumer neglects to actively reseal the top ply to the bottom ply.

The de-tackifying layer 13, in combination with the release layer 14, is designed such that resealability during multiple openings and re-closures is achieved without a tacky adhesive, minimizing adhesive contamination and graphic degradation due to contaminants from consumers' handling of the product.

The nature of the peel-tab is such that the combination of the top and bottom plies provides a consumer-friendly mechanism for peeling back and resealing the top ply.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A peel-back re-sealable multi-ply label, comprising:

(a) a bottom ply having an upper side and an underside; and (b) a top ply having a upper side and an underside, the underside of said top ply being bonded to the upper side of said bottom ply with permanent adhesive along a first edge to form a hinge.

2. A peel-back re-sealable multi-ply label as recited in claim 1, further comprising a peel-tab area on a second edge opposite said first edge, said bottom ply being die-cut at said peel-tab area and bonded to said top ply with permanent adhesive at said peel-tab area.

3. A peel-back re-sealable multi-ply label as recited in claim 1, wherein the underside of said bottom ply is coated with a pressure sensitive adhesive for affixing the label to a container.

4. A peel-back re-sealable multi-ply label as recited in claim 1, wherein the underside of said top ply is releasably bonded to the upper side of said bottom ply in all areas other than at said hinge and at said peel-tab area.

5. A peel-back re-sealable multi-ply label as recited in claim 4, wherein said releasable bond between said top ply and said bottom ply is formed by a permanent pressure sensitive adhesive, a detackifying layer and a release layer.

6. A peel-back re-sealable multi-ply label as recited in claim 5, wherein said release layer comprises an ultraviolet curable layer of multi functional oligomers and acrylates and reactive silicone.

7. A peel-back resealable multi-ply label as recited in claim 5, wherein said detackifying layer comprises a liquid varnish.

8. A peel-back re-sealable multi-ply label as recited in claim 1, wherein said top ply is printed with graphics on its upper side and underside.

9. A peel-back re-sealable multi-ply label as recited in claim 8, further comprising a protective overvarnish coated over the graphics on the upper side of said top ply.

10. A peel-back re-sealable multi-ply label as recited in claim 1, wherein the upper side of said bottom ply is printed with a graphics layer.

11. A peel-back re-sealable multi-ply label as recited in claim 1, wherein said top ply and said bottom ply each comprise a white, opaque, flexible olefin film.

* * * * *